United States Patent [19]
Saito et al.

[11] Patent Number: 5,104,937
[45] Date of Patent: Apr. 14, 1992

[54] RESIN COMPOSITION WITH AN EXCELLENT LOW-TEMPERATURE IMPACT RESISTANCE WHICH CONTAINS POLYPHENYLENE ETHER AND POLYAMIDE

[75] Inventors: Akihiro Saito; Kazunari Inoue, Utsunomiya; Hiromi Ishida; Masataka Morioka, both of Moka, all of Japan

[73] Assignee: GE Plastics Japan, Ltd., Tokyo, Japan

[21] Appl. No.: 398,032

[22] Filed: Aug. 24, 1989

[30] Foreign Application Priority Data

Aug. 24, 1988 [JP] Japan ................................ 63-208155

[51] Int. Cl.$^5$ ..................... C08L 53/02; C08L 71/12; C08L 77/00
[52] U.S. Cl. ..................................... 525/89; 525/396; 525/397; 525/905
[58] Field of Search ............................ 525/89, 92, 905

[56] References Cited

U.S. PATENT DOCUMENTS

| | | | |
|---|---|---|---|
| 4,277,575 | 7/1981 | Haaf et al. | 525/89 |
| 4,772,664 | 9/1988 | Ueda et al. | 525/92 |

*Primary Examiner*—Jacob Ziegler
*Attorney, Agent, or Firm*—Joseph T. Eisele

[57] ABSTRACT

Thermoplastic resin compositions which contain specified weight proportions of a polyphenylene ether resin, a polyamide resin and a rubber polymer consisting of a mixture of ABA or ABA' types of block copolymers and an AB block copolymer are improved by the presence of a miscibility enhancer. Representative of the miscibility enhancers are citric acid, malic acid, maleic anhydride, trimellitic chloride anhydride and the like. The compositions of the invention have been found to produce molded articles of improved low-temperature impact properties.

5 Claims, No Drawings

RESIN COMPOSITION WITH AN EXCELLENT LOW-TEMPERATURE IMPACT RESISTANCE WHICH CONTAINS POLYPHENYLENE ETHER AND POLYAMIDE

BACKGROUND OF THE INVENTION

1. Field of the Invention

The present invention concerns a thermoplastic resin composition characterized by excellent low-temperature properties. More specifically, the present invention concerns a resin composition which contains polyphenylene ether and polyamide and which exhibits an excellent low-temperature impact resistance.

2. Brief Description of the Prior Art

Since polyphenylene ether exhibits excellent mechanical properties and electrical properties, it is useful as a molding material resin. The oil resistance of said resin, however, is inferior. To alleviate this problem, attempts have been made to mix polyphenylene ether with polyamide., which is characterized by an excellent oil resistance (e.g., Japanese Kokai Patent No. Sho 56[1981]-16525). Since the mutual miscibility between the polyphenylene ether and polyamide is inferior, a molded product derived from the resulting resin composition fails to exhibit properties characteristic of the two resins (e.g., mechanical properties, etc.). To alleviate this problem, attempts have been made to add a compound which contains (a) carbon-carbon double bonds or triple bonds and (b) carboxylic acid groups, acid anhydride groups, acid amido groups, imido groups, carboxylic acid ester groups, or epoxy groups within the molecule to improve the impact resistance while an improved oil resistance is being sustained (see Japanese Kokai Patent No. Sho 56[1981]-26913).

Even if such a miscibility enhancer is added, however, it is impossible to obtain a sufficiently high impact resistance. Only when an impact resistance enhancer is also added, can an excellent impact resistance be obtained.

The resulting composition exhibits a sufficiently high stretching efficiency when a normal-temperature impact resistance test is carried out. When a low-temperature impact resistance test is carried out, however, the stretching efficiency is significantly low. When said composition is used for purposes which require adequate low-temperature properties, therefore, there are still problems which must be solved.

The foremost objective of the present invention is to provide a resin composition which contains polyphenylene ether and polyamide and which exhibits excellent low-temperature properties (especially low-temperature impact resistance).

SUMMARY OF THE INVENTION

The present invention has been completed after it had been discovered that, if two types of rubber polymers are mixed with a resin composition which contains polyphenylene ether and polyamide, the low-temperature properties (especially the low-temperature impact resistance) are significantly improved without adversely affecting various excellent properties of said resin composition.

In other words, the aforementioned objective of the present invention is attained using a thermoplastic resin composition which contains (i) 5–80 parts by weight of a polyphenylene ether resin, (ii) 20–95 parts by weight of a polyamide resin, and (iii) 0.01–10 parts by weight of a miscibility enhancer as well as (iv) 1–80 parts by weight of a rubber polymer with respect to 100 parts by weight of the combined weights of said components (i), (ii), and (iii) and in which said rubber polymer consists of (a) 3–97 wt% of an ABA-type or ABA'-type copolymer (or their combination) and (b) 97–3 wt % of an AB di-type block copolymer (in which A, A', and B are blocks derived from comonomers).

DETAILED DESCRIPTION OF THE PREFERRED EMBODIMENTS OF THE INVENTION

As polyphenylene ether component (i) of the present invention, conventionally known resins can be used. For example, polymers represented by the following general formula A:

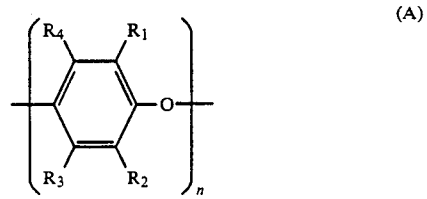

(in which $R_1$, $R_2$, $R_3$, and $R_4$ are monovalent substituents selected from among a hydrogen atom, halogen atoms, alkyl groups, alkoxy groups, and haloalkyl or haloalkoxy groups in which at least two carbon atoms are present between a halogen atom and a phenyl ring and in which no tertiary α-carbon is present; n is an integer pertaining to the degree of polymerization) may be used. Not only homopolymers consisting one of the polymers represented by the aforementioned general formula but also copolymers consisting of two or more polymer components can be used. Especially desirable results are obtained if $R_1$ and $R_2$ are alkyl groups containing 1–4 carbon atoms and if $R_3$ and $R_4$ are hydrogen atoms or alkyl groups containing 1–4 carbon atoms. Examples of such polymers include poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether, etc. An especially desirable polyphenylene ether resin is poly(2,6-dimethyl-1,4-phenylene) ether. As a polyphenylene ether copolymer, a copolymer in which the aforementioned polyphenylene ether repetition unit is partially substituted with an alkyl-tri-substituted phenol (e.g., 2,3,6-trimethylphenol, etc.) can be used. It is also possible to use a copolymer in which a styrene compound is grafted with said polyphenylene ether. As such a styrene-grafted polyphenylene ether, a copolymer obtained by graft-polymerizing a styrene compound (e.g., styrene, α-methylstyrene, vinyltoluene, chlorostyrene, etc.) with the aforementioned polyphenylene ether can be appropriately used.

An especially desirable polyphenylene ether used in the present invention contains $C_1$–$C_4$ alkyl substituents at two o-positions with respect to an oxygen ether atom. Examples of such polymers include poly(2,6-dimethyl-1,4-phenylene) ether, poly(2,6-diethyl-1,4-phenylene) ether, poly(2-methyl-6-ethyl-1,4-phenylene) ether, poly(2,6-dipropyl-1,4-phenylene) ether, poly(2-ethyl-6-propyl-1,4-phenylene) ether, etc.

Especially desirable results are obtained if the quantity of the polyphenylene ether resin is 5-80 parts by weight [with respect to 100 parts by weight] of the resin composition of the present invention.

As polyamide resin component (ii) of the present invention, polyamides which contain amino acids, lactams, or diamines and dicarboxylic acid as main constituent components can be appropriately used. Examples of said constituent components include lactams (e.g., ε-caprolactam, enantolactam, ω-laurolactam, etc.), amino acids (e.g., ε-aminocaproic acid, 11-aminoundecanic acid, 12-aminododecanic acid, etc.), diamines (e.g., tetramethylenediamine, hexamethylenediamine, undecamethylenediamine, dodecamethylenediamine, 2,2,4-/2,4,4-trimethylhexamethylenediamine, 5-methylnonamethylenediamine, m-xylylenediamine, p-xylylenediamine, 1,3-bisaminomethylcyclohexane, 1,4-bisaminomethylcyclohexane, bis-p-aminocyclohexylmethane, bis-p-aminocyclohexylpropane, isophoronediamine, etc.), and dicarboxylic acids (e.g., adipic acid, suberic acid, azelaic acid, sebacic acid, dodecanedicarboxylic acid, 1,4-cyclohexanedicarboxylic acid, 1,3-cyclohexanedicarboxylic acid, terephthalic acid, isophthalic acid, naphthalenedicarboxylic acid, dimeric acid, etc.). The aforementioned constituent components may be polymerized either alone or in combination of two or more, and the resulting polyamide homopolymers and copolymers can be equally used in the present invention. Examples of especially useful polyamides used in the present invention are polycaproamide (nylon 6), polyhexamethyleneadipamide (nylon 66), polyhexamethylenesebacamide (nylon 610), polyundecaneamide (nylon 11), polydodecaneamide (nylon 12), and copolymers or mixtures of the aforementioned polyamides. There are no special restrictions on the degrees of polymerization of the aforementioned polyamides. For example, polymers with relative viscosities (in a 1% concentrated sulfuric acid solution at 25° C.) of 1.5-5.0 can be appropriately used.

The terminal groups of the aforementioned polyamides are usually blocked to control the melt viscosity and to enhance the thermal stability. Generally speaking, the molar ratio of terminal carboxyl groups with respect to terminal amino groups (hereafter, "terminal group ratio") is 1 or below. As the polyamide of the present invention, however, polymers with terminal group ratios of above 1 are desirable (although polymers characterized by lower values can also be used). Such a polyamide can be manufactured by adding an excess of a compound which has a group which can be reacted with carboxyl groups (e.g., diamine, etc.) during a polyamide-polymerizing process. In an alternative format, a polyamide which has been obtained by polymerization is reacted with a compound which has a group which can be reacted with a carboxyl group. If a polyamide with a terminal group ratio of above 1 is used, the physical appearance and physical strength of the resulting molded product are significantly improved as compared with when a polyamide with a terminal group ratio of 1 or below is used. The theoretical foundation of such a difference has yet to be accounted for, but when an electron micrograph of the aforementioned molded product is examined, fine and uniform polyphenylene oxide particles are dispersed in the polyamide matrix. It is truly amazing that such a tremendous difference is observed based solely on the polyamide terminal group ratio difference. Especially desirable results are obtained if the terminal group ratio os 1.1 or above, preferably 1.3 or above.

It is desirable that the quantity of polyamide be 20-95 parts by weight [with respect to 100 parts by weight] of the resin composition of the present invention.

Examples of miscibility enhancers used in the present invention include polycarboxylic acids (e.g., citric acid, malic acid, etc.), compounds which contain (a) carbon-carbon double bonds or triple bonds and (b) carboxylic acid groups, acid anhydride groups, acid amido, groups, imido groups, carboxylic acid ester groups, or epoxy group within the molecule trimellitic chloride anhydride, etc. These miscibility enhancers may be used either alone or in combination of two or more. If necessary, furthermore, said miscibility enhancers may be used in combination with peroxides. It is desirable that the quantity of polyamide be 0.01-10 parts by weight [with respect to 100 parts by weight] of the resin composition of the present invention.

To improve miscibility between the polyphenylene ether and polyamide, a method in which a miscibility enhancer is simply added and mixed or a method where the polyphenylene ether is first modified by a reaction with citric acid, maleic anhydride, etc., and where the resulting modified polymer is mixed with polyamide can be used. If the polyphenylene ether is modified by adding trimellitic chloride anhydride, it is desirable that a chlorine acceptor (e.g., metal oxide, etc.) be also added.

The rubber polymers used in the present invention are characterized by the following types (a) and (b): (a) ABA-type or ABA'-type copolymer (or their combination); (b) AB type di block copolymer.

In the aforementioned types, A and A' are blocks derived from comonomers consisting of unsaturated alkenyl aromatic compounds (e.g., styrene, α-methylstyrene, vinyltoluene, vinylxylene, vinylnaphthalene, etc.) or their mixtures. B is a block derived from comonomers consisting of diene compounds (e.g., butadiene, chlorobutadiene, isoprene, 1,3-pentadiene, 2,3-dimethylbutadiene, etc.) or their mixtures.

The ABA-type or ABA'-type copolymer is a so-called "tapered" block copolymer, in which three blocks are directly connected to each other or via a "random copolymer" consisting of an alkenyl aromatic compound and a diene compound constituting each block, or a radial teleblock copolymer consisting of an alkenyl aromatic compound and a diene compound. The AB type di block copolymer is a "tapered" block copolymer in which two blocks are directly connected to one each other or via a "random copolymer" consisting of an alkenyl aromatic compound and a diene compound constituting each block.

Examples of especially desirable rubber polymers corresponding to the aforementioned type (a) include a styrene-ethylene-butadiene-styrene block copolymer, styrene-butadiene-styrene block copolymer, styrene-isoprene-styrene block copolymer, etc. Examples of especially rubber polymers corresponding to the aforementioned type (b) include a styrene-ethylene-propylene block copolymer, styrene-butadiene block copolymer, etc.

The aforementioned rubber polymers may be totally hydrogenated, partially hydrogenated, or acid-modified using maleic anhydride, etc. In particular, hydrogenated polymers are especially desirable in consideration of the thermal ageing resistance.

It is desirable that the quantity of rubber polymer content be 1-80 parts by weight [with respect to 100 parts by weight] of the resin composition of the present invention. Then, it is desirable that the relative quantities of components (a) and (b) be 3-97 wt % and 97-3 wt %, respectively.

If necessary, furthermore, other rubbers (e.g., ethylene-propylene rubber, etc.) may be used in combination with the aforementioned rubber polymers of components (a) and (b).

In addition to the aforementioned components, the resin composition of the present invention may also contain resins which are miscible with polyphenylene ether (e.g., polystyrene, etc.).

When the resin composition of the present invention is mixed or molded, furthermore, various additives (e.g., pigments, dyes, reinforcements, fillers, heat resistance enhancers, antioxidants, weather resistance enhancers, lubricants, mold-releasing agents, crystalline nucleating agents, plasticizers, flame retardants, fluidity enhancers, antistatic agents, etc.) may be used as long as these additives exert no adverse effects on the properties of the composition.

Since the resin composition of the present invention is characterized by excellent fluidity, it can be molded by all conceivable molding methods (e.g., injection-molding method, blow-molding method, extrusion-molding method, etc.), and the resulting molded product exhibits excellent impact resistance (preferably low-temperature impact resistance) as well as superb heat resistance, water resistance, and dimensional stability. Said molded product is especially desirable as automotive exterior components (e.g., faders, door panels, quarter panels, pumpers, spoilers, wheel caps, fuel lids, side shields, etc.) and general mechanical components.

There are no special restrictions on procedures for manufacturing the resin composition of the present invention. Thus, ordinary procedures can be used. Especially desirable results are obtained in the melt-mixing method. There are no special restrictions on the melt-mixing temperature and time, and these factors can be optimized in consideration of the material resistance. The optimum temperature depends somewhat on the polyphenylene ether/polyamide mixing ratio, but generally speaking, it is desirable that the temperature be 270-350° C. A long time and/or high shearing rate are desirable during the mixing process, but then the degradation of the resin composition is accelerated. The mixing time, therefore, must be selected in consideration of these factors.

Arbitrary melt-mixing methods can be used as long as viscous melted masses can be appropriately treated. Both, the batch and continuous formats can be used. Examples of mixing apparatuses include an extruder, Banbury mixer, roller, kneader, etc.

The entire components may be added directly to a single treatment system or polymer. Other components of the polymer may be added to the treatment system both directly and simultaneously, or certain additives may be first mixed together.

In the paragraphs to follow, the contents of the present invention will be explained in further detail with reference to application examples.

EXAMPLES 1-3 and COMPARATIVE EXAMPLES 1 and 2

1. Preparation of polyphenylene ether (poly(2.6-dimethyl-1,4-phenylene) ether)

After 332 parts of toluene, 10 parts by weight of 2,6-xylenol, 4.3 parts by weight of dimethyl-n-butylamine, 1.0 part by weight of di-n-butylamine, 0.3 part by weight of di-t-butylethylenediamine, and a solution which had been obtained by dissolving 0.08 part by weight of cuprous oxide in 0.8 part by weight of a 50 wt % aqueous HBr solution had been placed into a stainless steel reaction container equipped with an agitation mechanism, oxygen inlet tube, and a heat exchanger in that order, oxygen was passed through the resulting solution, which was being agitated, and at the same time, 90 parts by weight of 2,6-xylenol were introduced into said reaction container over a 40-min period. The reaction temperature was approximately 35° C. while the molecular weight was being gradually raised. The passage of the oxygen stream was terminated approximately 120 min later. Subsequently, by-product 2,6-dimethyldiphenoquinone was introduced to and reacted with the polymer while the polymer solution temperature was being maintained at 50-70° C. After nitrotriacetic acid had been added to said polymer solution and complexed with the copper catalyst, was removed by the liquid-liquid centrifugal separation method. After the solvent had been distilled and removed from the polymer before said polymer had been precipitated in methanol, the polymer solution was concentrated until the initial weight had been reduced to approximately 30 wt %. After the resulting polymer had been dried and filtered, a polyphenylene ether powder was obtained. The specific viscosity of said polyphenylene ether polymer (in 25° C. chloroform) was approximately 0.45 dL/g.

2. In the present process, the following components were used: polyphenylene ether obtained in process 1 as component (i); nylon 6 as polyamide component (ii); citric acid as miscibility enhancer component (iii); styrene-ethylene-butadiene-styrene block copolymer (KG 1651, trademark of Shell Co.) and styrene-ethylene-propylene block copolymer (KG 1701, trademark of Shell Co.) as rubber polymer component (iv).

After the aforementioned components had been mixed together, the resulting mixture was extruded from a biaxial extruder equipped with a vacuum vent at 290° C. Thus, a pellet was obtained. After said pellet had been molded from an injection-molding machine (cylinder temperature: 280° C.; injection pressure: 80 kg/cm$^2$; mold temperature: 60° C.), a 5 cm×5 cm×0.3 cm test piece was obtained.

After the resin compositions of examples of the invention and comparison examples characterized by the compositions shown in Table I had been molded according to the aforementioned procedures, each of the resulting test pieces underwent low-temperature (−30° C. and −40° C.) and normal-temperature impact resistance tests. In these tests, each test piece was punched at a constant rate of 5 m/sec. Ten test pieces were evaluated in each test, and the fracture state of each test piece was evaluated by the unaided eye. The fracture energy was simultaneously measured. The results are summarized in Table I.

TABLE I

|  |  | EXAMPLE 1 | EXAMPLE 2 | EXAMPLE 3 | COMPARATIVE EXAMPLE 1 | COMPARATIVE EXAMPLE 2 |
|---|---|---|---|---|---|---|
| Component (i) | Polyphenylene ether (parts by weight) | 44 | 44 | 44 | 44 | 44 |
| Component (ii) | Polyamide (parts by weight) | 40 | 40 | 40 | 40 | 40 |
| Component (iii) | Citric acid (parts by weight) | 1.0 | 1.0 | 1.0 | 1.0 | 1.0 |
| Rubber Component (a) | KG 1651 | 12 | 8 | 4 | 16 | 0 |
| Rubber Component (b) | KG 1701 | 4 | 8 | 12 | 0 | 16 |
| | Fracture state | | | | | |
| 23° C. | Number of tenacious sheets (N) | 10 | 10 | 10 | 10 | 10 |
| | Number of brittle sheets (N) | 0 | 0 | 0 | 0 | 0 |
| −30° C. | Number of tenacious sheets (N) | 10 | 10 | 10 | 7 | 6 |
| | Number of brittle sheets (N) | 0 | 0 | 0 | 2 | 4 |
| −40° C. | Number of tenacious sheets (N) | 10 | 10 | 8 | 6 | 4 |
| | Number of brittle sheets (N) | 0 | 0 | 2 | 4 | 6 |
| | Fracture energy (kg · cm) | | | | | |
| | −30° C. | 475 | 460 | 430 | 415 | 360 |
| | −40° C. | 485 | 470 | 435 | 400 | 360 |

The low-temperature impact resistances of the resin compositions of the present invention containing two types of rubber polymers (a) and (b) (i.e., Application Examples 1, 2, and 3) were far superior to those of resin compositions containing one rubber polymer each (Comparative Examples 1 and 2).

We claim:

1. A thermoplastic resin composition which comprises (i) 5-80 parts by weight of the composition of a polyphenylene ether resin, (ii) 20-95 parts by weight of the composition of a polyamide resin, and (iii) 0.01-10 parts by weight of the composition of a miscibility enhancer selected from the group consisting of polycarboxylic acids, compounds which contain carbon-carbon double bonds, compounds which contain carbon-carbon triple bonds and compounds which contain carboxylic acid groups, acid anhydride groups, acid amino groups, imido groups, carboxylic acid ester groups, epoxy groups and trimellitic chloride anhydride, (iv) 1-80 parts by weight of a mixture of rubber block copolymers with respect to 100 parts by weight of the combined weight of said components (i), (ii), and (iii) said rubber copolymers consisting of (a) 3-97 wt % of an ABA'-type or ABA'-type copolymer and (b) 97-3 wt % of an AB type di-block copolymer wherein A and A' are each blocks derived from comonomers selected from the group consisting of unsaturated alkenyl aromatic compounds and mixtures thereof; B is a block derived from comonomers selected from the group consisting of diene compounds and mixtures thereof.

2. The composition of claim 1 wherein the miscibility enhancer is citric acid.

3. The composition of claim 1 wherein the rubber polymer consists of a mixture of styrene-ethylene-butadiene-styrene block copolymer (SEBS) and styrene-ethylene-propylene block copolymer (SEP).

4. The composition of claim 3 wherein the weight ratio of SEBS:SEP is within the range of from 1:3 to 3:1.

5. A composition of claim 1 wherein there are 44 parts by weight of the polyphenylene ether resin; 40 parts by weight of the polyamide resin; 1.0 parts by weight of citric acid as the miscibility enhancer; and 16 parts by weight of the rubber polymer, which consists of a mixture of styrene-ethylene-butadiene-styrene block copolymer and styrene-ethylene-propylene block copolymer in a weight ratio within the range of from 1:3 to 3:1.

* * * * *